United States Patent [19]

Hulsing II

[11] Patent Number: 4,935,883
[45] Date of Patent: Jun. 19, 1990

[54] APPARATUS AND METHOD FOR LEVELING A GRAVITY MEASUREMENT DEVICE

[75] Inventor: Rand H. Hulsing II, Redmond, Wash.

[73] Assignee: Sundstrand Data Control, Inc., Redmond, Wash.

[21] Appl. No.: 194,888

[22] Filed: May 17, 1988

[51] Int. Cl.⁵ .................... G01V 13/00; G01V 7/00
[52] U.S. Cl. ..................... 364/559; 33/302; 73/382 R; 73/382 G; 175/45; 364/422; 364/571.01
[58] Field of Search ........... 33/302; 73/382 R, 382 G; 175/45; 364/422, 434, 559, 571.01

[56] References Cited

U.S. PATENT DOCUMENTS

| | | | |
|---|---|---|---|
| 2,899,826 | 8/1959 | La Coste | 73/382 |
| 2,928,667 | 3/1960 | Peterson | 73/490 |
| 3,011,346 | 12/1961 | Garvin | 73/382 |
| 3,073,165 | 1/1963 | Slater et al. | 73/382 |
| 3,250,133 | 5/1966 | Savet | 73/517 AV |
| 3,474,672 | 10/1969 | La Coste et al. | 73/382 |
| 3,633,003 | 1/1972 | Taiwani | 73/382 X |
| 3,727,462 | 4/1973 | Stone et al. | 73/382 |
| 3,731,537 | 5/1973 | Trageser | 73/382 |
| 3,926,054 | 12/1975 | Buck | 73/382 G |
| 4,021,774 | 5/1977 | Asmundsson et al. | 175/45 X |
| 4,085,440 | 4/1978 | Hose | 364/434 X |
| 4,435,981 | 3/1984 | Carson et al. | 73/382 R |
| 4,550,601 | 11/1985 | Evans | 73/382 R |
| 4,599,896 | 7/1986 | Stewart | 73/382 R |

Primary Examiner—Parshotam S. Lall
Assistant Examiner—Edward R. Cosimano
Attorney, Agent, or Firm—Christensen, O'Connor, Johnson & Kindness

[57] ABSTRACT

Apparatus and method for establishing a level plane and with respect to the level plane, vertically aligning an acceleration sensitive axis of a gravity measurement device (10). The gravity measurement device includes an accelerometer (68), which is rotatably mounted on a gimbal shaft (62) within a gimbal frame (54). The gimbal frame is also rotatable about a longitudinal axis that is preferably oriented at a right angle to the longitudinal axis of the gimbal shaft. A stepping motor (20) is connected through an antibacklash gear (30), an idler gear (32) and an antibacklash gear (48) to a drive shaft (50). Rotation of this drive shaft causes the accelerometer to rotate about the gimbal shaft. In a similar fashion, a stepping motor (22) is drivingly connected to a drive shaft (56), used to rotate the gimbal frame. A control (140) selectively energizes the stepping motors, so that the acceleration sensitive axis of the accelerometer is rotated until an output signal from the acceleometer indicates that the acceleration of gravity is zero and thus that the sensitive axis is level at two cross axis positions, thereby determining a level reference plane. The control then causes the accelerometer to be rotated 90° relative to the reference plane, so that the acceleration sensitive axis is vertically aligned, thereby enabling the accelerometer to measure the local acceleration of gravity with minimal error due to vertical alignment.

22 Claims, 5 Drawing Sheets

APPARATUS AND METHOD FOR LEVELING A GRAVITY MEASUREMENT DEVICE

TECHNICAL FIELD

This invention generally concerns a gravitational acceleration sensor and, more specifically, pertains to the method by which the sensor is leveled so that the acceleration of gravity may be measured along a vertical axis.

BACKGROUND OF THE INVENTION

The earth's gravitational field varies, depending upon the position at which it is measured, the density of adjacent mass, the altitude or depth of the measurement and the proximity of natural topographical features and man-made artifacts of substantial mass, such as mountains and large buildings. Variations in gravitational field have been measured with precision over a substantial portion of the earth's surface, and maps have been prepared relating gravitational field intensity to position. While these maps are of scientific interest, they also have military applications. Using these maps, for example, a submerged submarine can navigate while on covert missions by monitoring gravity profiles along the ocean floor.

Accurate gravity measurement is also important to the petroleum industry. Precision gravity surveys of depleted oil or gas wells are sometimes made, in which variations in local gravity are monitored in the microgal or nano-g range, to develop data profiling variations in the density of the strata surrounding the well or borehole that may provide an indication of untapped pockets of gas or oil. Gravity measurements at this level of resolution require use of a very high precision gravity sensor, and great care must be taken during the measurements to achieve usable results. For example, the gravity sensor must be oriented so that its sensitive axis is vertically aligned. Deviation from vertical alignment by an angle $\theta$ produces an error equal to the value of the gravitational acceleration, g, multiplied by cos $\theta$. Thus, a deviation from vertical, by an angle $\theta$ equal to 50 microradians contributes one nano-g (or about one microgal) error.

A conventional gravity measurement device of the type used in gravimetric logging of boreholes, typically includes a sensor fixed to a frame, that is mounted in a two-axis gimbal, so that a reference plane in the frame may be precisely leveled. The sensor is fixed at a precise angle of 90° relative to the reference plane, enabling its sensitive axis to be vertically aligned by leveling the reference plane. Clearly, the angular relationship between the reference plane and the sensitive axis must be correct to avoid alignment errors. Both the lack of precision in properly leveling the reference plane and the difficulty in maintaining the precise 90° angle between the sensitive axis of the gravity measurement device and the reference plane have significantly hindered the speed, resolution, and accuracy of prior art gravity measurement devices. In addition, the two-axis gimbal of such prior art devices has been limited to rotation about each axis through an angle of only about ±12°. The limited angle of gimbal travel has made gravity measurement impossible for use in surveying boreholes having an inclination angle in excess of 12°.

Another approach for determining vertical alignment for gravity measurement uses a wheel rotating about a level axis. A plurality of accelerometers are mounted around the periphery of the wheel and are operative to produce an output signal that periodically cycles through a +1 g, 0 g, −1 g, and 0 g indication as the wheel rotates. The advantage of this approach over the two-axis gimbal device is that data produced by the rotating accelerometers may be processed to determine and cancel bias errors in the output signal. However, it is still necessary to level the axis of rotation of the wheel, so that the plane of the wheel is vertical. Furthermore, the signals output by the accelerometers must be transmitted to a processor through slip rings or other moving electrical connections, likely to introduce noise. Processing the signal output from a rotating accelerometer is also more difficult and potentially a source of error; the result is in part dependent on accurately timing the rotation of the wheel.

The limitations and problems associated with prior art gravity measurement devices described above, particularly with respect to accurately leveling the devices so that the sensitive axis of the gravity sensor is vertically aligned, have greatly inhibited widespread use of precision gravity surveys, particularly with respect to gravimetric borehole logging surveys. The present invention provides a simple, very accurate solution to this problem, which promises to greatly improve the accuracy and speed with which such measurements may be made. These and other advantages of the present invention will be apparent from the attached drawings and the Description of the Preferred Embodiment that follows.

SUMMARY OF THE INVENTION

In accordance with the present invention, apparatus and a method are provided for leveling a gravity measurement device. The apparatus includes a first gimbal, which is mounted on the gravity measurement device and is rotatable about a first axis. A second gimbal is mounted on the first gimbal and is rotatable about a second axis that is disposed at a substantial angular displacement relative to the first axis. Means are provided for sensing acceleration along an acceleration sensitive axis, producing a signal indicative of the acceleration. The acceleration sensing means are mounted on the second gimbal so that the acceleration sensitive axis is at a right angle relative to the second axis. Also included are means for incrementally rotating the first and the second gimbals to orient the acceleration sensitive axis to a first position and then to a second position, at which the signal produced by the acceleration sensing means indicates substantially a minimum acceleration due to gravity.

The first and second positions define a level plane for the first and second gimbals, so that the acceleration sensitive axis may be oriented substantially vertically, relative to the level plane. Vertical orientation of the acceleration sensitive axis enables the acceleration sensing means to accurately measure gravity.

The means for incrementally rotating the first and the second gimbals comprise a first and a second stepping motor and control means for controlling the stepping motors as a function of the signal produced by the acceleration sensing means. The control means selectively energize the first and the second stepping motors, incrementally rotating the first and the second gimbals about their respective first and second axes. One rotational step of each stepping motor corresponds to a predetermined incremental angle through which the gimbals are rotated. Thus, the control means rotate the acceleration sensing means so that the acceleration sensitive axis lies within the level plane at two different orientations, determining the number of steps of the first and second stepping motors, respectively, required in driving the gimbals to vertically orient the acceleration sensitive axis relative to the level plane.

The means for incrementally rotating the first and second gimbals further include first and second gear means for respectively drivingly connecting the first and second stepping motors to the first and second gimbals. The first gear means comprise a first drive gear, and at least one antibacklash gear. The second gear means include a second drive gear, at least one antibacklash gear, and two bevel gears.

In a preferred embodiment of the present invention, the first and second axis define a right angle. Further, the first gimbal comprises an outer ring connected to a first drive shaft that is aligned with the first axis. The antibacklash gear of the first gear means is mounted upon the first drive shaft. One of the bevel gears is attached to the second gimbal, concentric to the second axis. The other bevel gear is mounted on a second drive shaft that is aligned with the first axis, and drivingly engages the one bevel gear as the second drive shaft rotates about the first axis. The second drive shaft is in turn rotatably driven by the antibacklash gear of the second gear means. The first and second stepping motors respectively rotate the first and second drive gears to drivingly rotate the antibacklash gears. The first and second gear means may each further include an idler shaft on which are mounted another antibacklash gear and an idler gear, the first and second drive gears respectively engaging the other antibacklash gear and thus drivingly rotating the idler gear. The idler gear engages the one antibacklash gear and transmits the rotational motion to it.

DESCRIPTION OF THE PREFERRED EMBODIMENT

Figures 1, 2:
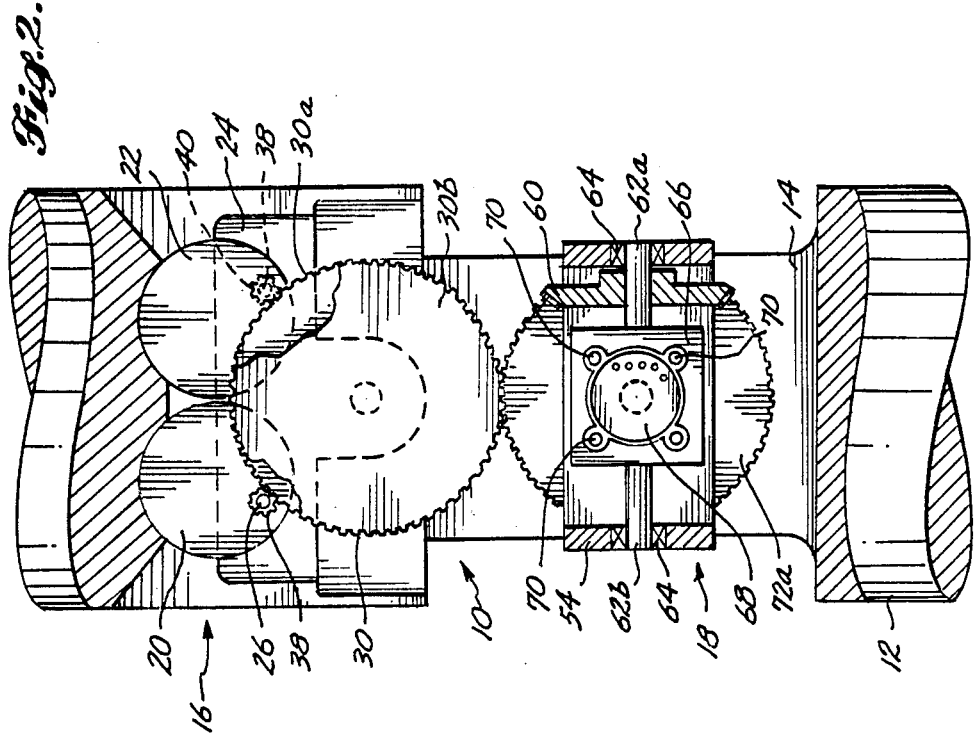
FIG. 1 is an elevational view of a gravity measurement device, a portion of an enclosure being cut away to expose the mechanism for determining a level reference plane.
FIG. 2 is a cross-sectional view of the gravity measurement device, taken along section line 2—2 of FIG. 1.
Figure 3:
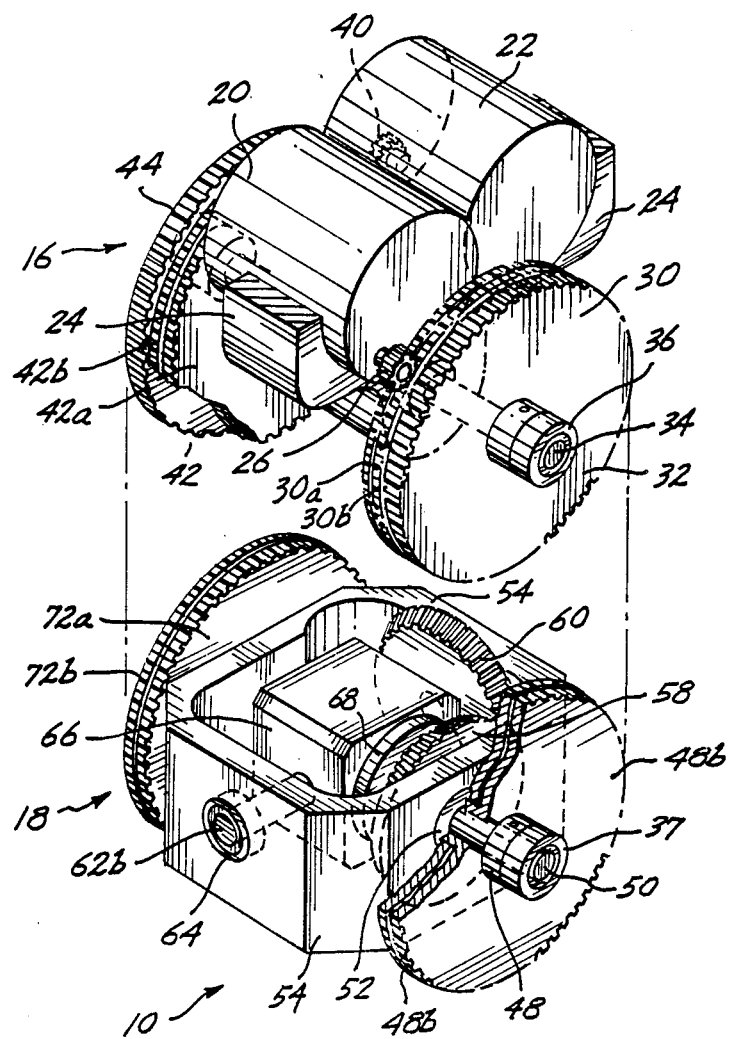
FIG. 3 is an isometric view showing a stepping motor assembly exploded away from a gimbal assembly of the gravity measurement device, the enclosure being completely removed for clarity.

With reference to FIGS. 1, 2, and 3, a gravity measurement device generally denoted by reference numeral 10 is illustrated. Included within the gravity measurement device is the present invention for determining level so that an accurate measurement of the acceleration of gravity may be made in a properly aligned vertical direction. The gravity measurement device is supported in a frame 14 and is normally fully enclosed by a tubular enclosure 12. However, in both FIGS. 1 and 2, the tubular enclosure is cut away to better disclose the elements comprising the device.

In a typical borehole gravimetric survey application, two gravity measurement devices 10 are mounted within a survey probe comprising tubular enclosure 12, spaced approximately 10 feet apart. The probe is lowered by a cable down a borehole (neither shown), enabling the density of the earth strata surrounding the borehole to be monitored with respect to variations in the local acceleration of gravity. Each of the two gravitational measurement devices operates independently of the other, but share a common microprocessor control, common wire line power supply module and common communications interface module. Details of the control and of these modules with respect to a single gravitational measurement device are disclosed hereinbelow. While use of the leveling apparatus in a gravity measurement device for borehole gravimetry represents one preferred application of the present invention, it should be understood that there are numerous other unrelated applications for which the invention is equally applicable.

Gravity measurement device 10 generally comprises a stepping motor assembly 16 and a gimbal assembly 18, shown exploded apart in FIG. 3. The stepping motor assembly includes a stepping motor 20 and a stepping motor 22 mounted generally parallel to each other in a mounting yoke 24, which is attached to frame 14. However, with reference to FIG. 1, a motor drive shaft of stepping motor 20 extends toward the right side of the FIGURE, and includes a pinion gear 28, which drivingly engages an antibacklash gear 30.

Antibacklash gears are well known in the precision mechanical gear drive art, and are readily available commercially in a variety of sizes and torque specifications. Antibacklash gear 30 is split into two halves 30a and 30b, along a line parallel to the face of the gear. A spring mounted between the two halves 30a and 30b (not shown) provides a force tending to rotate the two antibacklash gear halves in an opposite direction around their common axis of rotation. The force provided by the spring exceeds the drive force provided by stepping motor 20 through pinion gear 28, so that each side of any tooth on the pinion gear that is engaged with antibacklash gear 30, engages opposing teeth on the halves 30a and 30b. Thus, it will be apparent that virtually all gear backlash, which would otherwise occur upon reversal of the direction of rotation of motor drive shaft 26, is substantially eliminated by antibacklash gear 30 as it rotates an idler shaft 34, on which it is mounted. One end of idler shaft 34 is rotatably mounted within a bearing 36 disposed in mounting yoke 24, and the other end is rotatably mounted in a bearing 36 disposed in frame 14.

Similarly, stepping motor 22 includes a motor drive shaft 38, which extends to the left as shown in FIG. 1. A pinion gear 40 is mounted on the motor drive shaft, engaging an antibacklash gear 42. Antibacklash gear 42 includes two halves 42a and 42b, which are operative to rotate an idler shaft 46, on which antibacklash gear 42 is mounted. Idler shaft 46 is also rotatably mounted within bearings 36, disposed on mounting yoke 24 and frame 14, on an opposite side of the tubular enclosure from idler shaft 34. The two idler shafts are aligned on a common axis, but are independently rotated by the stepping motors.

Idler gear 32 engages another antibacklash gear 48, comprising the two halves 48a and 48b. As explained above, antibacklash gear 48 substantially eliminates backlash due to reversal in the direction of rotation of idler gear 32. As idler gear 48 rotates, it turns a drive shaft 50 on which it is mounted. One end of drive shaft 50 rotates within bearings 37, mounted within frame 14, and another portion of the drive shaft rotates within bearings 52, which are mounted within one side of a gimbal frame 54. A first bevel gear 58 is mounted on an inwardly extending end of drive shaft 50, inside gimbal frame 54. The side of gimbal frame 54 opposite drive shaft 50 is supported by a drive shaft 56.

Turning to FIG. 2, it can be seen that a second bevel gear 60 is mounted upon a gimbal shaft 62a, which is mounted within a bearing 64, disposed at one side of gimbal frame 54. A second gimbal shaft 62b is also mounted within a bearing 64 disposed at the opposite side of gimbal frame 54. The inner ends of gimbal shafts 62a and 62b extend along a common axis, in support of an accelerometer mount 66, which is generally centered within gimbal frame 54. An accelerometer 68 is mounted within a cavity formed in accelerometer mount 66, using bolts 70 or other suitable fasteners. An acceleration sensitive axis of accelerometer 68 is disposed at a right angle to a longitudinal axis of the first and second gimbal shafts 62a and 62b. Likewise, the longitudinal axis of first and second gimbal shafts 62a and 62b is at right angle to a longitudinal axis of drive shaft 50, shown in FIG. 1. Gimbal frame 54 thus comprises a first gimbal on bearing shafts 50 and 56, and gimbal shafts 62a and 62b and accelerometer mount 66 comprise a second gimbal, the first and second gimbals enabling accelerometer 68 to be rotated about two orthogonal axes.

Rotation of drive shaft 50 causes the first bevel gear to rotate, and since it drivingly engages the second bevel gear, causes first gimbal shaft 62a to rotate accelerometer mount 66, and attached accelerometer 68. Stepping motor 20 is thus able to orient the acceleration sensitive axis of accelerometer 68 through substantially 360° about the longitudinal axis of first and second gimbal shafts 62a and 62b. However, the acceleration sensitive axis remains perpendicular to the longitudinal axis of the gimbal shafts during such rotation.

By energizing stepping motor 22, an idler gear 44 co-mounted on idler shaft 46 with antibacklash gear 42 is caused to rotate. Idler gear 44 drivingly engages an antibacklash gear 72, which comprises first and second halves 72a and 72b, mounted on drive shaft 56. Antibacklash gear 72 substantially eliminates gear backlash during the reversal of the rotational motion of idler gear 44, as previously explained. Drive shaft 56 is rotatably mounted within bearings 39, which are disposed in frame 14. Antibacklash gear 72 is pinned to gimbal frame 54 and the inwardly extending end of drive shaft 56 is attached to gimbal frame 54 so that rotation of drive shaft 56 causes the gimbal frame to rotate about the longitudinal axis of the drive shaft (which is aligned with the longitudinal axis of drive shaft 50). Rotation of gimbal frame 54 about the longitudinal axis of drive shaft 56 also rotates accelerometer 68 about that axis. Since rotation of the gimbal frame causes relative motion between first and second bevel gears 58 and 60, it should be clear that in order to maintain the acceleration sensitive axis of accelerometer 68 in a given angular relationship about the longitudinal axis of first and second gimbal shafts 62a and 62b, stepping motor 20 must also be energized to cause drive shaft 50 to rotate in a direction and to an extent sufficient to compensate for the relative rotation between the bevel gears caused by stepping motor 22.

Figure 4:
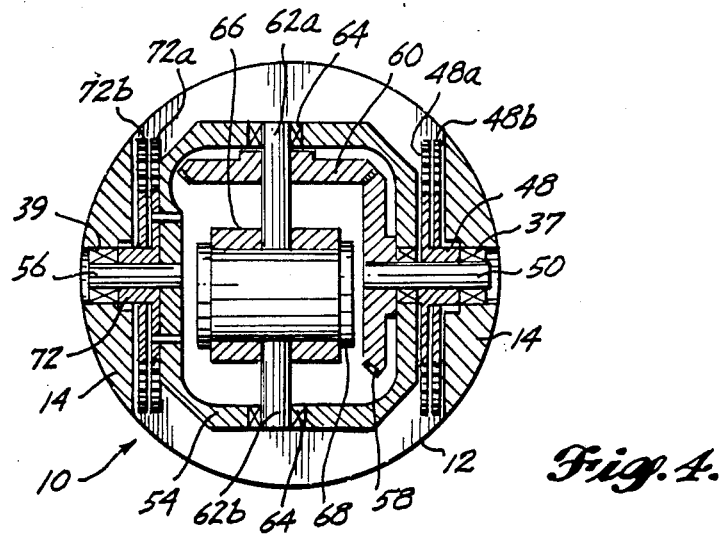
FIG. 4 is a cross-sectional view of the gimbal assembly, taken along section line 4—4 of FIG. 1.

The relationship of the elements comprising the gimbal assembly is clearly illustrated in the cross-sectional view of FIG. 4. From this view, it is apparent that the common longitudinal axis of drive shafts 50 and 56 forms a right angle with the longitudinal axis of first and second gimbal shafts 62a and 62b. Furthermore, it should be clear that accelerometer 68 may be rotated so that its acceleration sensitive axis is oriented in almost any desired direction by selectively energizing stepping motors 20 and 22.

Referring now to FIGS. 5A through 5D, a model of a gimbal assembly is generally identified by reference numeral 100. These FIGURES illustrates four positions in which the gimbal assembly may be placed, to change the direction in which an acceleration sensitive axis 118 of an accelerometer 116 mounted therein is aligned. The model of the gimbal assembnly includes supports 102, which are analogous in function to frame 14 of the above disclosed gravity measurement device. A rectangular gimbal frame 104 is rotatably mounted on pivot shafts 106, disposed at two opposed sides of the gimbal frame. Pivot shafts 106 rotate in supports 102, within bearings 108. Gimbal frame 104 is thus rotatable about a longitudinal axis of pivot shafts 106, just as gimbal frame 54 is rotatable about the longitudinal axis of drive shaft 56 (and drive shaft 50).

Figure 5A:
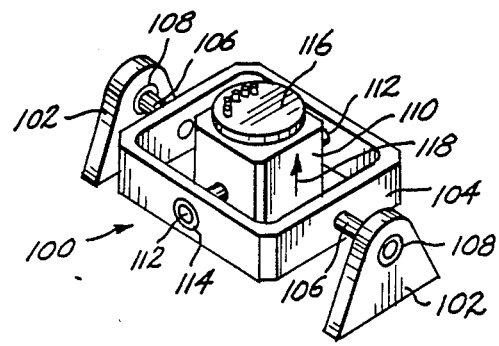
FIGS. 5A through 5D are a series of four isometric views of a model gimbal assembly, illustrating the rotational motion required to orient an acceleration sensitive axis of an accelerometer mounted therein to four different horizontal/vertical positions.

An accelerometer mount 110 is supported within gimbal frame 104 on pivot shafts 112, the outer ends of pivot shafts 112 being rotatably mounted within bearings 114 on the two remaining opposed sides of gimbal frame 104. Pivot shafts 112 are thus analogous to gimbal shafts 62a and 62b. An arrow 118 appears on the sides of the accelerometer mount in the illustration to indicate the direction in which the acceleration sensitive axis of accelerometer 116 is pointing. In FIG. 5A, arrow 118 points upward, indicating that the acceleration sensitive axis is almost vertically aligned in a positive direction. An output signal from accelerometer 116 in this position would read about 1 g, subject to any error in vertical alignment of the acceleration sensitive axis.

Figure 5B:
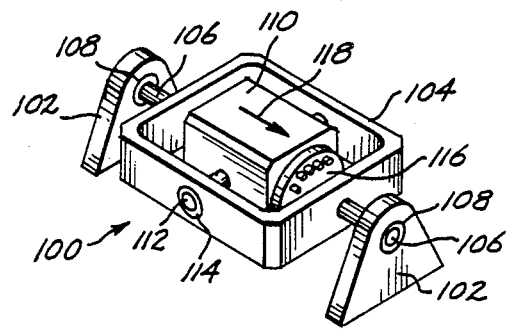

In FIG. 5B, accelerometer mount 110 is rotated about pivot shafts 112, so that the acceleration sensitive axis points toward the foremost support 102, as indicated by arrow 118. The acceleration sensitive axis is horizontally aligned in FIG. 5B, when the output signal produced by accelerometer 116 indicates substantially 0 g.

Figure 5C:
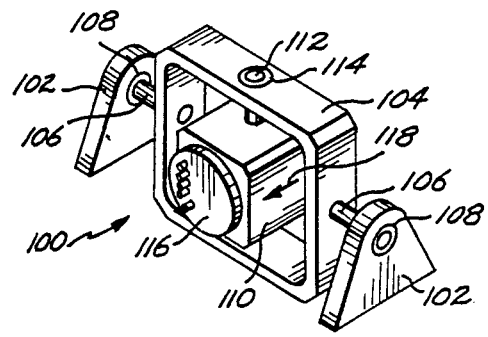

To achieve the disposition shown in FIG. 5C, accelerometer mount 110 is initially rotated by exactly 90° about pivot shafts 112, so that the acceleration sensitive axis points upward similar to the position shown in FIG. 5A, and then gimbal frame 104 is rotated about pivot shafts 106 so that the acceleration sensitive axis is horizontally aligned, but pointing in a direction at a right angle to that of arrow 118 in FIG. 5B. The horizontally aligned position is again found by monitoring the output signal of accelerometer 116 to determine the position where the signal indicates that the acceleration of gravity along the acceleration sensitive axis is approximately equal to zero.

Figure 5D:
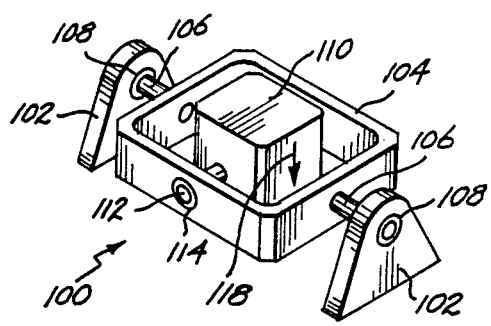

Finally, in FIG. 5D, gimbal frame 104 is further rotated about pivot shafts 106 through exactly 90°, so that the acceleration sensitive axis of accelerometer 116 points vertically downward, in the direction of arrow 118, thereby producing an output signal corresponding to −1 g. Rotation about both pivot shafts 106 and 112, to a position in which the acceleration sensitive axis points in the opposite direction from that of FIG. 5D, i.e., rotation through exactly 180°, aligns the axis vertically, so that +1 g may be measured.

After studying the relatively simplistic gimbal assembly model 100, it should be easy to understand how the present invention is used to establish a level reference plane corresponding to the two positions of accelerometer 116 in FIGS. 5B and 5C, and to orient the accelerometer so that its acceleration sensitive axis is vertically aligned for measurement of the acceleration of gravity with respect to that reference plane as shown in FIG. 5D. Gimbal assembly model 100 simplistically shows the longitudinal axis extending through pivot shafts 106 as being generally horizontal, so that accelerometer 116 is almost vertically aligned in FIG. 5A. However, the same method may be used to determine vertical (with respect to a level plane), regardless of the initial relationship of the level reference plane to the pivot shafts 106 and 112.

With respect to gravity measurement device 10, the sequence of steps taken to determine a level reference plane, so that the acceleration sensitive axis of accelerometer 68 can be vertically aligned to measure a local acceleration of gravity, is as follows: (a) accelerometer mount 66 is rotated about the longitudinal axis of gimbal shafts 62a and 62b until the output signal from accelerometer 68 indicates that the acceleration of gravity along the acceleration sensitive axis is substantially zero and thus that the acceleration sensitive axis of the accelerometer is substantially level; (b) accelerometer mount 66 is rotated back through an angle of 90° about the longitudinal axis of gimbal shafts 62a and 62b; (c) gimbal frame 54 is then rotated so that the output signal of accelerometer 68 again indicates an acceleration of gravity substantially equal to zero, and thus that the acceleration sensitive axis is substantially level in a cross axis direction compared to that of step (a); (d) gimbal frame 54 is again rotated about the longitudinal axis of drive shaft 56 through 90° relative to its position in step (c), aligning the acceleration sensitive axis in a negative vertical direction, so that −1 g may be accurately measured; and, (e) accelerometer mount 66 is rotated about gimbal shaft 62a and 62b and gimbal frame 54 is rotated about the longitudinal axis of drive shaft 56, so that the acceleration sensitive axis of accelerometer 68 is vertically aligned in a positive direction and, thus, the output signal is indicative of +1 g. The position of accelerometer 68 in step (e) is offset by 90° relative to the two cross axis level positions of steps (a) and (c) and by 180° relative to the position in step (d). The negative and positive measurements of the acceleration of gravity in the steps (d) and (e) may be averaged to cancel any bias in the output signal of the accelerometer, resulting in a highly accurate and precise measurement for the local acceleration of gravity in the vicinity of gravity measurement device 10.

Rotation of the accelerometer to each orientation in the foregoing procedure is obtained by selectively energizing the stepping motors, to rotate accelerometer mount 66 and gimbal frame 54 about the orthogonal rotatable axes on which they are mounted. To achieve the 90° rotation from each of the level positions in steps (b) and (d), and the rotation through 180° in step (e), with an accuracy of 50 microradians, the resolution of the stepping motors and the associated gear train must be 50 microradians or less. Rotation through a 90° angle can be achieved by counting steps from a position in which the accelerometer indicates a zero g reading. If each step of the stepping motor is equal to 50 microradians, rotation through 90° is determined by counting 31,416 steps. Although antibacklash gears 30, 42, 48 and 72 are used in the gear trains connecting each of the stepping motors to their respective drive shafts 50 and 56, any residual backlash and gear compliance must be taken into account at turn around points where the direction of the rotational driving force is reversed. Error due to backlash and gear compliance can be determined during each positioning sequence by stepping past the point at which the accelerometer indicates 0 g or level, by a predetermined number of steps corresponding to a known angle, and then stepping back a known number of steps, while reading the change in angle with respect to the acceleration of gravity. Deviation from a level position by an angle $\theta$ can accurately be determined since the output signal from accelerometer 68 varies as sine $\theta$ when its acceleration sensitive axis is relatively close to level. Once determined, the correction for backlash and gear compliance can be added to the stepping motor drive signal as required.

Accelerometer 68 is preferably of the type which produces an output signal having a frequency proportional to acceleration. Such an accelerometer lends itself to digital processing of the signal produced. In an all digital system, the same processor used to control the leveling mechanism may be used to process the signals indicating the acceleration of gravity.

Figure 6:
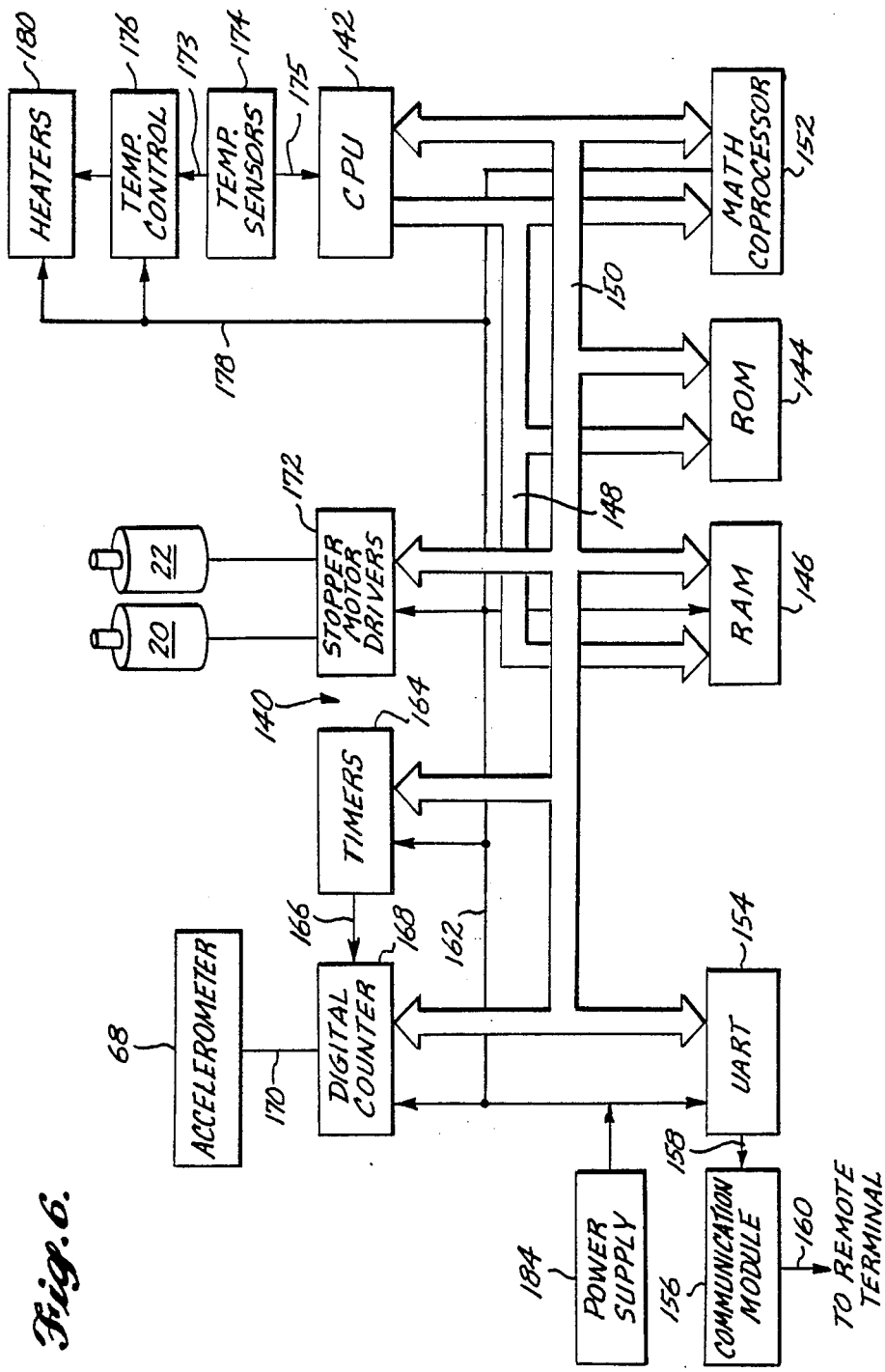
FIG. 6 is a block diagram of a control for the gravity measurement device.

FIG. 6 illustrates a preferred embodiment of a control used to level accelerometer 68 and to process its output signal in measuring the acceleration of gravity. The control includes a microprocessor CPU 142 which is connected to read only memory (ROM) 144 and to random access memory (RAM) 146 by address lines 148 and data lines 150. The ROM is used to store a digital program implementing the above-defined steps of the algorithm for leveling accelerometer 68, and in addition, to store the algorithms required to process its output signal to determine the acceleration of gravity. Details of the latter algorithms are not disclosed herein since that information is not required to understand the present invention. Variables computed during the processing of the accelerometer data and other temporary data are stored in the RAM for access by the CPU. A math coprocessor 152 is connected to CPU 142 through address lines 148 and data lines 150, and is operative to reduce the floating point mathematical calculation overhead on the CPU, greatly increasing the speed with which mathematical calculations may be made within control 140. In the preferred embodiment, a Motorola Corporation type 68020 CPU and type 68881 math coprocessor are preferably used. However, other types of CPUs and math coprocessors having similar characteristics might equally well be used.

Data developed by CPU 142 is communicated to an operator via data lines 150, which connect to a universal asynchronous receiver/transmitter (UART) 154. The UART is connected via leads 158 to a communications module 156, which in the application of the preferred embodiment for borehole gravimetric measurements is used to handle communications with a remote terminal (not shown) through a cable line 160. Communication module 156 and UART 154 operate bidirectionally, enabling an operator located topside of the borehole to communicate commands to control 140, for example, causing it to initiate a leveling procedure and to measure gravity at a given position in a borehole, and to transmit data from the measurement to the remote terminal.

The signal indicative of acceleration, which is output from accelerometer 68, is conveyed via leads 170 to a digital counter 168. A 400 Hz timer 164 generates a read interrupt signal for the digital counter which is input thereto over leads 166. Digital counter 168 determines the frequency of the output signal, including fractional cycles of the signal (by comparison to the number of cycles of an internal high frequency clock). Data representing the frequency of the signal output from accelerometer 68 and thus the acceleration it is measuring are provided CPU 142 over data lines 150.

Stepping motors 20 and 22 are controlled by CPU 142 in accordance with digital data input to stepping motor drivers 172 over data lines 150. The sequential steps described above for determining level and for aligning the acceleration sensitive axis of accelerometer 68 vertically to measure the acceleration of gravity are carried out by CPU 142, as provided in a software digital program stored within ROM 144. Stepping motor drivers 172 take their commands from the CPU and drive stepping motors 20 and 22 through the required number of steps determined by the CPU, accordingly. CPU 142 ensures that stepping motors 20 and 22 are energized as required.

To achieve maximum precision in measurement of the acceleration of gravity, gravity measurement device 10 includes an internal temperature control circuit, including a plurality of temperature sensors 174, which are disposed at spaced apart positions within tubular enclosure 12. The output from temperature sensors 174 is converted from an analog signal to a digital signal by an A to D converter (not separately shown), and transmitted to CPU 142 over leads 175. The temperature within the enclosure is controlled by temperature control 176 in response to the signals produced by temperature sensors 174 and transmitted over leads 173. CPU 142 applies appropriate temperature correction factors in modeling the acceleration data derived from accelerometer 68, correcting for errors in the control of temperature by temperature control 176.

In the preferred embodiment, temperature control 176 attempts to maintain the temperature within tubular enclosure 12 at approximately 98° ±2° C. by energizing heaters 180 as required. In addition, a more critical temperature control is provided for accelerometer 68, which is preferably maintained at 100° ±0.1° C.

A power supply 184 provides power for each of the components of control 140 via leads 162. In the preferred embodiment in which gravity measurement device 10 is used for gravimetric surveys of a borehole, power supply 184 is provided unregulated power from a topside source (not shown), and includes a plurality of regulated power supplies which provide power at an appropriate voltage to each of the components of control 140.

There are several advantages to the configuration of gravity measurement device 10, in which stepping motor assembly 16 is physically set apart from gimbal assembly 18. As noted above, it is desirable to maintain accelerometer 68 at a precise temperature to avoid errors due to temperature fluctuation. By physically separating stepping motors 20 and 22 some distance apart from accelerometer 68, the accelerometer is less affected by heat radiated from the stepping motors as they are energized to rotate the accelerometer during the leveling process and for orienting the accelerometer to measure gravity. By changing the configuration of the stepping motor assembly, it would also be possible to drive antibacklash gear 48 directly with pinion gear 28, thereby eliminating antibacklash gear 30, idler gear 32, and idler shaft 34. Similarly, pinion gear 38 could directly drive antibacklash gear 72, eliminating antibacklash gear 42, idler gear 44, and idler shaft 46. To accomplish this change, stepping motors 20 and 22 must be rotated 180°, so that they extend outside tubular enclosure 12 (to avoid interfering with gimbal frame 54) and moved appropriately closer to the gimbal assembly. This change would make gravity measurement device 10 less compact and increase the heat flowing to the gimbal assembly from the stepping motor assembly.

There is a further advantage of the present invention over the prior art devices. Since the precision measurement of gravity is made after the stepping motors are deenergized, there is no noise coupling between the stepping motors and the accelerometer that might otherwise exist between an acceleration sensitive device and an active servo as used in prior art systems.

The presence of microprocessor 142 in control 140 permits a level reference plane to be determined, even when the longitudinal axis of tubular enclosure 12 is at a relatively high inclination angle. At high inclination angles, rotation of accelerometer 68 about gimbal shafts 62a and 62b interacts with rotation of gimbal frame 54 about the longitudinal axis of drive shaft 50. Should the longitudinal axis of drive shaft 50 lie in a vertical plane, the sequence of steps required to determine a level reference plane must include a different position for accelerometer mount 66, rotating it about the longitudinal axis of gimbal shafts 62a and 62b, in order to find a level position for gimbal frame 54. This level position for the gimbal frame is easily determined with an appropriate coordinate transformation. Such coordinate transformations are well known to those of ordinary skill in the art, and are easily implemented with microprocessor 142 and math coprocessor 152.

Using the accelerometer itself to determine level automatically compensates for any shift in accelerometer axis alignment, which can be a problem in prior art systems using secondary level sensors. Also, the stepping motors in the present invention can self-calibrate their angular rotation so that no secondary angle sensors are needed.

In the preferred embodiment, the accelerometer is rotated about the two orthogonal axes comprising the longitudinal axes of drive shafts 50 and 56, and of gimbal shafts 62a and 62b. It would also be possible to rotate accelerometer 68 about non-orthogonal axes, so that a first and second level position of the accelerometer in which its output signal indicates 0 g are not disposed at a right angle to each other. To accurately define a level plane, the level positions should be separated by a substantial angle, but the angle need not be 90°.

While the present invention has been described with respect to a preferred embodiment and modifications thereto, those of ordinary skill in the art will understand that other modifications may be made within the scope of the claims that follow below. Accordingly, the scope of the invention is to be determined entirely by reference to the claims, and should not be in any way limited by the disclosure of the preferred embodiment.

The embodiments of the invention in which an exclusive property or privilege is claimed are defined as follows:

1. In a device for measuring the acceleration of gravity using an accelerometer, an apparatus for vertically orienting an acceleration sensitive axis of the accelerometer, comprising:
    (a) first means for rotating the accelerometer about a first axis that is orthogonal to the acceleration sensitive axis;
    (b) second means for rotating the accelerometer about a second axis that is angularly displaced from the first axis;
    (c) drive means, connected to the first and the second means, for selectively driving the first and the second means to orient the acceleration sensitive axis of the accelerometer in a plurality of substantially horizontal directions, defining a level plane; and
    (d) processor means, responsive to a signal produced by the accelerometer indicative of the acceleration of gravity, for controlling the drive means as a function of said signle in order to establish the level plane, and further operative to vertically align the acceleration sensitive axis of the accelerometer relative to the level plane.

2. The apparatus of claim 1, wherein the drive means are spatially separated from the accelerometer to minimize heat transfer therebetween.

3. The apparatus of claim 1, wherein the first means comprise a shaft on which the accelerometer is rotatably mounted.

4. The apparatus of claim 3, wherein the second means comprise a rotatable frame in which the shaft is mounted, the first means being rotatable within the frame.

5. The apparatus of claim 4, wherein the drive means comprise a first and a second stepping motor and gear means for drivingly connecting the first and the second stepping motors to the frame and to the shaft.

6. The apparatus of claim 1, wherein the processor means is operative to energize the drive means, causing:
    (a) the first and the second means to rotate the accelerometer to a first and a second position in which the signal produced by the accelerometer indicates that the acceleration of gravity acting along the acceleration sensitive axis is substantially zero, the acceleration sensitive axis thus being substantially horizontal in the first and the second positions; and
    (b) the first and the second means to rotate the accelerometer to a third position in which the acceleration sensitive axis is substantially orthogonal to its horizontal disposition in both the first and the second positions of the accelerometer, the acceleration sensitive axis being substantially vertically aligned in said third position.

7. The apparatus of claim 6, wherein the processor means is further operative to energize the drive means, causing the accelerometer to rotate to a fourth position in which the acceleration sensitive axis is substantially vertically aligned in the opposite direction, relative to its disposition in the third position.

8. The apparatus of claim 6, wherein the angle subtended by the acceleration sensitive axis when the accelerometer is in the first and the second positions is substantially ninety degrees.

9. In a gravity measurement device, an apparatus for determining a level disposition that is orthogonal to a gravitational acceleration, comprising:
    (a) a first gimbal, mounted on the gravity measurement device and rotatable about a first axis;
    (b) a second gimbal, mounted on the first gimbal and rotatable about a second axis, which is disposed at a substantial angular displacement relative to the first axis and intersects it;
    (c) means for sensing acceleration along an acceleration sensitive axis and producing a signal indicative of the acceleration, said means being mounted on the second gimbal so that the acceleration sensitive axis is disposed at a right angle relative to the second axis, being rotatable about both the first and second axes; and
    (d) means for incrementally rotating the first and the second gimbals to orient the acceleration sensitive axis to a first position and then to a second position at which the signal produced by the acceleration sensing means indicates substantially a minimum acceleration due to gravity, said first and second positions defining a level plane for the first and the second gimbals, so that the acceleration sensitive axis may be oriented vertically relative to the level plane.

10. The apparatus of claim 9, wherein the means for incrementally rotating the first and the second gimbals comprise a first stepping motor, a second stepping motor, and control means connected to receive the signal produced by the acceleration sensing means, for controlling the first and the second stepping motors as a function of said signal.

11. The apparatus of claim 10, wherein the control means is operative to selectively energize the first and the second stepping motors, incrementally rotating the first and the second gimbals about their respective first and second axes, one rotational step of each stepping motor corresponding to a predetermined incremental angle.

12. The apparatus of claim 11, wherein the control means is operative to rotate the acceleration sensing means about the first and second axes, until the acceleration sensitive axis lies within the level plane in two different orientations and thus to determine the number of steps of the first and second stepping motors required in driving the first and the second gimbals, respectively, to vertically orient the acceleration sensitive axis, relative to said level plane.

13. The apparatus of claim 10, wherein the means for incrementally rotating the first and the second gimbals further comprise first gear means for drivingly connecting the first stepping motor to the first gimbal, and second gear means for drivingly connecting the second stepping motor to the second gimbal.

14. The apparatus of claim 13, wherein the first gear means comprise a first drive gear and at least one antibacklash gear, and the second gear means comprise a second drive gear, at least one antibacklash gear and two bevel gears.

15. The apparatus of claim 14, wherein the first axis defines a right angle with the second axis and wherein the first gimbal comprises an outer ring, connected to a first drive shaft that is aligned with the first axis, the antibacklash gear of the first gear means being mounted on the first drive shaft, and wherein the one of the bevel gears is attached to the second gimbal, concentric to the second axis, the other bevel gear being mounted on a second drive shaft that is aligned with the first axis, and drivingly engaging said one bevel gear, said second drive shaft being rotatably driven by the antibacklash gear of the second gear means, said first and second drive gears respectively drivingly connecting the first and second stepping motors to the antibacklash gears.

16. The apparatus of claim 15, wherein the first and second gear means each further comprise a rotatably mounted idler shaft on which are mounted another antibacklash gear and an idler gear, the first and second drive gears each engaging one of said other antibacklash gears and thus drivingly rotating the idler gear, said idler gear engaging the one antibacklash gear and transmitting rotational motion to it.

17. In a device for measuring the acceleration of gravity using an accelerometer having an acceleration sensitive axis, a method for vertically orienting the acceleration sensitive axis of the accelerometer, comprising the steps of:
 (a) rotating the accelerometer about a first axis to a first position in which the acceleration sensitive axis is horizontally disposed;
 (b) rotating the accelerometer about a second axis, orthogonal to the first, to a second position in which the acceleration sensitive axis is horizontally disposed; and
 (c) rotating the accelerometer about the first and the second axes to a third position in which the acceleration sensitive axis is displaced by substantially ninety degrees relative to its disposition at the first and the second positions, said third position of the accelerometer orienting the acceleration sensitive axis vertically.

18. The method of claim 17, further comprising the step of rotating the accelerometer about one of the first and the second axes to a fourth position in which the acceleration sensitive axis is oriented vertically in the opposite direction from that in which it is disposed in the third position.

19. In a precision gravity measurement device having an accelerometer for sensing the acceleration of gravity along a sensitive axis and producing a signal indicative thereof, a method for determining a level disposition that is orthogonal to the acceleration of gravity, comprising the steps of:
 (a) incrementally rotating the accelerometer about a first axis that is at right angles to the acceleration sensitive axis, to a position at which the signal the accelerometer produces indicates substantially a zero component of the acceleration of gravity along the sensitive axis, thereby defining a first level point associated with the first axis;
 (b) rotating the accelerometer through an angle of ninety degrees about the first axis to a position where its sensitive axis is generally oriented vertically;
 (c) incrementally rotating the accelerometer about a second axis that is angularly displaced relative to the first axis, to a position at which the signal the accelerometer produces indicates substantially a zero component of the acceleration of gravity along the sensitive axis, thereby defining a second level point associated with the second axis; and
 (d) incrementally rotating the accelerometer about at least one of the first and the second axes, through an angle determined relative to the first and the second level points, respectively, so that the acceleration sensitive axis is substantially vertical, and so that the accelerometer accurately measures the acceleration of gravity with minimal vertical alignment errors.

20. The method of claim 19, further comprising the steps of first orienting the acceleration sensitive axis precisely vertical relative to the first and second level points, and then rotating the accelerometer through 180 degrees about one of the first and the second axes so that the acceleration of gravity is measured in an opposite vertical disposition of the acceleration sensitive axis.

21. The method of claim 19, wherein the accelerometer is mounted on orthogonally rotatable first and second gimbals having a first axis and a second axis of rotation coincident with the first and second axes, respectively.

22. The method of claim 21, wherein the accelerometer is mounted on one of the first and the second gimbals, and wherein the first and second gimbals are respectively rotated by a first and a second stepping motor, the relationship between the first and second level points and the vertical orientation of the acceleration sensitive axis corresponding to a predetermined number of steps of the stepping motors.

* * * * *